(12) United States Patent
Chang et al.

(10) Patent No.: US 12,201,191 B2
(45) Date of Patent: *Jan. 21, 2025

(54) ARTICLES, BLADDERS AND METHODS OF MAKING ARTICLES AND BLADDERS

(71) Applicant: NIKE, Inc., Beaverton, OR (US)

(72) Inventors: Yihua Chang, Portland, OR (US); Christopher J. Dimitriou, Portland, OR (US); Jeremy Gantz, Lake Oswego, OR (US); Adam Kohn, Beaverton, OR (US); Richard L. Watkins, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 637 days.

This patent is subject to a terminal disclaimer.

(21) Appl. No.: 17/418,663

(22) PCT Filed: Feb. 27, 2019

(86) PCT No.: PCT/US2019/019714
§ 371 (c)(1),
(2) Date: Jun. 25, 2021

(87) PCT Pub. No.: WO2020/176081
PCT Pub. Date: Sep. 3, 2020

(65) Prior Publication Data
US 2022/0061464 A1 Mar. 3, 2022

(51) Int. Cl.
*B41J 3/407* (2006.01)
*A43B 1/00* (2006.01)
(Continued)

(52) U.S. Cl.
CPC ............ *A43D 95/14* (2013.01); *A43B 1/0027* (2013.01); *A43B 13/206* (2013.01);
(Continued)

(58) Field of Classification Search
CPC .............................. B41J 3/4073; A43B 13/20
See application file for complete search history.

(56) References Cited

U.S. PATENT DOCUMENTS

| 4,002,792 A | 1/1977 | Petersen et al. |
| 4,427,802 A | 1/1984 | Moulton et al. |

(Continued)

FOREIGN PATENT DOCUMENTS

| CN | 1197093 A | 10/1998 |
| CN | 1398311 A | 2/2003 |

(Continued)

OTHER PUBLICATIONS

International Preliminary Report on Patentability for PCT/US2018/057658 mailed on Oct. 10, 2019.
(Continued)

*Primary Examiner* — Cachet I Proctor
(74) *Attorney, Agent, or Firm* — Shook, Hardy & Bacon L.L.P.

(57) ABSTRACT

The present disclosure is directed to articles that have a surface comprising a polymeric material having a printed layer disposed thereon that is durable and flexible. Prior to formation of the printed layer, the surface of the article can comprise a first layer of a first composition disposed on a portion of the polymeric material. The first composition can include a dispersion of uncrosslinked polymers (e.g., a water-borne dispersion of uncrosslinked polymers). The printed layer can be included on an article of footwear, a component of footwear, apparel, a component of apparel, sporting equipment, or a component of sporting equipment.

14 Claims, 1 Drawing Sheet

(51) Int. Cl.
*A43B 13/20* (2006.01)
*A43D 95/14* (2006.01)
*B29C 37/00* (2006.01)
*B29L 31/50* (2006.01)

(52) U.S. Cl.
CPC ......... *B29C 37/0025* (2013.01); *B41J 3/4073* (2013.01); *B29L 2031/504* (2013.01)

(56) References Cited

U.S. PATENT DOCUMENTS

| | | | |
|---|---|---|---|
| 4,523,005 | A | 6/1985 | Szycher |
| 4,599,413 | A | 7/1986 | Moulton et al. |
| 5,244,739 | A | 9/1993 | Carlson et al. |
| 5,334,690 | A | 8/1994 | Schafheutle et al. |
| 5,713,141 | A | 2/1998 | Mitchell et al. |
| 5,952,065 | A | 9/1999 | Mitchell et al. |
| 5,952,250 | A | 9/1999 | Kim et al. |
| 5,969,076 | A | 10/1999 | Lai et al. |
| 6,001,469 | A | 12/1999 | Verardi et al. |
| 6,013,340 | A | 1/2000 | Bonk et al. |
| 6,082,025 | A | 7/2000 | Bonk et al. |
| 6,127,026 | A | 10/2000 | Bonk et al. |
| 6,203,868 | B1 | 3/2001 | Bonk et al. |
| 6,321,465 | B1* | 11/2001 | Bonk ............ B32B 27/08 36/35 B |
| 6,897,281 | B2 | 5/2005 | Lubnin et al. |
| 7,008,555 | B2 | 3/2006 | Hayes et al. |
| 7,476,705 | B2 | 1/2009 | Pajerski |
| 7,611,547 | B2* | 11/2009 | Bracken ............ D06P 1/14 8/607 |
| 7,842,391 | B2 | 11/2010 | Watkins et al. |
| 10,980,311 | B2 | 4/2021 | Edwards |
| 11,464,281 | B2 | 10/2022 | Bartel et al. |
| 11,647,809 | B2 | 5/2023 | Edwards |
| 11,723,429 | B2 | 8/2023 | Bartel et al. |
| 2001/0005660 | A1 | 6/2001 | Li et al. |
| 2003/0060608 | A1* | 3/2003 | Hasemann ......... C09B 67/0073 106/31.47 |
| 2003/0131756 | A1 | 7/2003 | Smith et al. |
| 2003/0154871 | A1 | 8/2003 | Laksin et al. |
| 2007/0020463 | A1 | 1/2007 | Trainham |
| 2008/0003399 | A1* | 1/2008 | Abrams ............. B44C 1/105 156/72 |
| 2008/0176061 | A1 | 7/2008 | Ambrose et al. |
| 2009/0069122 | A1 | 3/2009 | Laliberty |
| 2009/0071036 | A1 | 3/2009 | Hooper et al. |
| 2010/0113687 | A1 | 5/2010 | Schaefer et al. |
| 2010/0159772 | A1 | 6/2010 | Ashida et al. |
| 2013/0176369 | A1* | 7/2013 | Gotou ............ B41M 5/0023 347/100 |
| 2014/0250720 | A1* | 9/2014 | Miner ............ A43B 1/0027 36/29 |
| 2015/0128452 | A1 | 5/2015 | Hull et al. |
| 2015/0210034 | A1 | 7/2015 | Tarrier et al. |
| 2016/0075113 | A1 | 3/2016 | Chang et al. |
| 2016/0295963 | A1* | 10/2016 | Chang .................. A43B 1/0072 |
| 2016/0304734 | A1* | 10/2016 | Feng .................. B41M 7/0081 |
| 2017/0088735 | A1 | 3/2017 | Jakubek et al. |
| 2018/0229426 | A1 | 8/2018 | Douroumis et al. |
| 2019/0125028 | A1 | 5/2019 | Bartel et al. |
| 2019/0125029 | A1* | 5/2019 | Edwards ................ A43B 5/185 |
| 2020/0299513 | A1 | 9/2020 | Chang et al. |

FOREIGN PATENT DOCUMENTS

| | | |
|---|---|---|
| CN | 102369474 A | 3/2012 |
| CN | 103192620 | 7/2013 |
| CN | 104144994 A | 11/2014 |
| CN | 105263353 A | 1/2016 |
| CN | 107404976 | 11/2017 |
| CN | 111511240 A | 8/2020 |
| CN | 111511241 A | 8/2020 |
| JP | 2002-088291 A2 | 3/2002 |
| WO | 9700736 A1 | 1/1997 |
| WO | 2009029641 A1 | 3/2009 |
| WO | 2014138573 A2 | 9/2014 |
| WO | 2016164549 A1 | 10/2016 |
| WO | 2017079255 A1 | 5/2017 |
| WO | 2019036190 A1 | 2/2019 |
| WO | 2019084367 A1 | 5/2019 |
| WO | 2019084382 A1 | 5/2019 |
| WO | 2020190518 A1 | 9/2020 |

OTHER PUBLICATIONS

International Preliminary Report on Patentability for PCT/US2018/057681 mailed on Oct. 7, 2019.
International Preliminary Report on Patentability for PCT/US2019/019714 mailed Dec. 1, 2020.
International Search Report and Written Opinion for PCT/US2020/021227 mailed Jul. 7, 2020.
International Search Report and Written Opinion for PCT/US2018/057658 mailed Feb. 13, 2019.
International Search Report and Written Opinion for PCT/US2018/057681 mailed Jan. 30, 2019.
International Search Report and Written Opinion for PCT/US2019/019714 mailed Apr. 24, 2019.
Written Opinion of the International Preliminary Examining Authority for PCT/US2020/021227 mailed Sep. 21, 2020.
International Preliminary Report for PCT/US2020/021227 mailed Jun. 23, 2021.
Written Opinion PCT/US2019/019714 mailed Aug. 4, 2020.
SancureTM 20025F Polyurethane Dispersion product data sheet from Lubrizol (Year: 2021).
European search report received for European Application No. 24161001.3, mailed on Jun. 28, 2024. 7 pages.

* cited by examiner

ARTICLES, BLADDERS AND METHODS OF MAKING ARTICLES AND BLADDERS

CLAIM OF PRIORITY TO RELATED APPLICATION

This application claims priority to International Application No. PCT/US2019/019714, having the title "ARTICLES, BLADDERS AND METHODS OF MAKING ARTICLES AND BLADDERS", filed on Feb. 27, 2019.

BACKGROUND

Footwear, clothing, accessories, or athletic wear are often a source of expression for the wearer and can include colors to associate with a team, coordinate with another item, or provide the user with an attractive or customized item. Footwear can include uppers, midsoles and inflated bladders, or airbags, for cushioning, and each can be colored so as to be part of the source of expression.

DESCRIPTION

Figure 1:
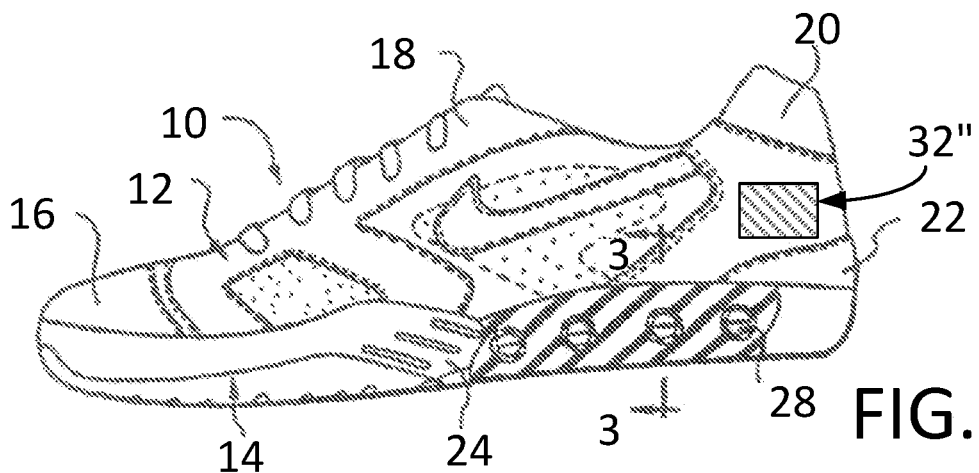
FIG. 1 is a side elevational view of an athletic shoe with a portion of the midsole cut-a-way to expose a cross-sectional view.

The present disclosure is directed to articles that have a surface comprising a polymeric material having a printed layer disposed thereon that is durable and flexible. Prior to formation of the printed layer, the surface of the article can comprise a first layer of a first composition disposed on a portion of the polymeric material. The first composition can include a dispersion of uncrosslinked polymers (e.g., a water-borne dispersion of uncrosslinked polymers). The polymeric material on the surface of the article can be made of a thermoplastic material. A color composition can be applied (e.g., spraying) onto the first layer of the article, such as a bladder, while the first composition is wet. In other words, the color composition is applied to the first layer prior to the first layer being allowed to dry, where drying can include an active drying step or passive drying. Alternatively, the color composition can be applied to the surface of the article and then the first composition can be applied to the surface having the color composition, or in yet another alternative the first composition and the color composition can be applied simultaneously to the surface of the article, in each case then allowed to dry. In this way the colorant (e.g., dye, pigment, or combination thereof) in the color composition can be applied to the article to give a desired color, where the printed layer can be on the surface of the article, penetrate into the surface, or both. The printed layer can be included on an article of footwear, a component of footwear, apparel, a component of apparel, sporting equipment, or a component of sporting equipment.

The printed layer bonds particularly well to the polymeric material due to penetration of the solvent into the polymeric material prior to drying the first layer, which lends itself to being a durable decorative coating. The first layer being in a wet, non-dried state permits the solvent of the color composition to penetrate the polymeric material to form the durable decorative coating, where if the first layer were dried, the solvent would have limited, if any contact with the polymeric material of the article.

When used with relatively soft thermoplastic polymeric materials, particularly thermoplastic polyurethane, the solvent system of the color composition can penetrate into the polymeric material, carrying the colorant with it, creating the printed layer which can extend at least partially below the surface of the polymeric material, creating a flexible yet durable printed layer. Also, when used on barrier membranes, the colorant of the color composition adhered well and penetrated into the membrane without negatively impacting the gas barrier properties or flexibility of the membrane, while still producing a quality printed image that didn't crack when flexed.

The color composition disposed on the wet first composition can include one or more pigments, one or more dyes such as acid dyes, or a combination thereof. In addition, the colorant composition can include a solvent system that has good compatibility with the polymeric materials of the article and components of the printing equipment (e.g., print head) used to dispose the colorant composition onto the article. Other solvent systems have limited compatibility in that they tend to rapidly degrade components in the printing system, have limited compatibility with components of the printing system, and/or polymeric materials of the articles. The solvent system can include alcohols, ketones, esters, cyclic sulfones, glycol ethers, glycol ether esters, lactams, lactones, and combinations thereof.

The present disclosure provides for a method of printing on an article, comprising: applying a first composition onto a first side of an article, wherein the first composition comprises a dispersion of uncrosslinked polymers, and the first side of the article comprises a polymeric material; applying a color composition onto the first layer; and allowing the color composition and the first layer to dry in contact with the first side forming a printed layer on the first side of the article. The disclosure also provides for where the step of applying the color composition onto the first side of the article comprises applying the color composition to the polymeric material exposed on the first side of the article, and, following the step of applying the color composition but prior to the step of allowing the color composition to dry, the method further comprises allowing the color composition to penetrate into the polymeric material. The color composition comprises one or more pigments, dyes, water, one or more organic solvents, or a combination thereof, where the solvent is selected from alcohols, ketones, esters, cyclic sulfones, glycol ethers, glycol ether esters, lactams, and lactones. The dispersion of uncrosslinked polymers is a water-borne dispersion of uncrosslinked polymers and in a carrier, wherein the carrier is water or an aqueous solution. The dispersion of uncrosslinked polymers includes a water-borne dispersion of uncrosslinked polyurethane copolymers, a water-borne dispersion of uncrosslinked polyester polyurethane polymers, or both. The polymeric material comprises one or more polyurethane, polyether, polyester, polyurea, polyamide, polyolefin, or any combination thereof.

The present disclosure provides for an article comprising: a bladder having a printed layer on a first side of the bladder, wherein the first side of the article comprises a polymeric material, wherein the printed layer is a product of a first composition and a color composition, wherein the first composition comprises a dispersion of uncrosslinked polymers, wherein the first bladder wall has a gas transmission rate of 15 cm³/m²·atm·day or less for nitrogen for an average wall thickness of 20 mils. The article is an article of footwear, a component of footwear, an article of apparel, a component of an article of apparel, an article of sporting equipment, or a component of sporting equipment. The present disclosure also provides for a method of making an article of footwear, comprising: affixing a first component and the article as described above and herein to one another, thereby forming an article of footwear.

Now having described embodiments of the present disclosure generally, additional discussion regarding embodiments will be described in greater details.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of material science, chemistry, textiles, polymer chemistry, and the like. Although methods and materials similar or equivalent to those described herein can be used in the practice or testing of the present disclosure, suitable methods and materials are described herein. As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Now having briefly described aspects of the present disclosure, additional features will be described. The present disclosure relates to an article (e.g., a bladder) that can include the printed layer. The printed layer includes a colorant such as a dye (e.g., an acidic dye), a pigment, or a combination thereof. In general, the printed layer can be formed after disposing the color composition onto the first composition on the article, while the first composition is wet (e.g., not 100% dry to form a solid material layer) and then allowing the color composition and the first composition to dry. The first composition can include a water-borne dispersion of uncrosslinked polymers (e.g., a water-borne dispersion of uncrosslinked polyester polyurethane copolymers). The surface of the article can comprise the polymeric material such as a thermoplastic. In an aspect, the first layer can be considered wet if the solvent of the color composition can penetrate the polymeric material to produce a durable printed layer. In another aspect, the first layer can be considered wet if the first layer is tacky and the solvent of the color composition can penetrate the polymeric material to produce a durable printed layer. In another aspect, the first layer can be considered wet if the first layer is less than 100% dry to form the solid material layer and the solvent of the color composition can penetrate the polymeric material to produce a durable printed layer.

The printed layer can be on an outside surface or an inside surface of the article or both. The printed layer can be chemically bonded (e.g., covalently bonded, ionically bonded, hydrogen bonded, and the like) to the surface of the article. The printed layer can be a coating on the surface of the article and can extend into the surface of the article. The printed layer can have a thickness of about 0.01 μm to 1000 μm.

The present disclosure provides for an article including the printed layer, such as a bladder, that can be incorporated into a number of different types of articles of manufacture. For example, the bladder can be used as a cushioning element once inflated (e.g., fluid-filled bladder). The article (e.g., a part of a larger article, as a bladder, or other component) can be included in, affixed to, or incorporated in an article such as an article of footwear, a component of footwear, apparel, a component of apparel, sporting equipment, or a component of sporting equipment. In particular, the article can include footwear (e.g., dress shoes, athletic footwear, hiking boots, work boots, or the like), skates (e.g., hockey skates, figure skates, in-line skates, roller skates, or the like), apparel (e.g., shirts, jerseys, pants, shorts, gloves, glasses, socks, hats, caps, jackets, undergarments), locomotive equipment (e.g., bicycles, motorcycles, skateboards, cars, trucks, boats, surfboards, skis, snowboards, etc.), balls (e.g., soccer balls, footballs, basketballs, kickballs, etc.), bags (e.g., straps of a backpack), bicycle seats, saddles, personal protective articles (e.g., helmets, shin guards, hockey gloves, chest protectors), article of furniture, or novelty item. When used in footwear or skates, the bladder can be used as a cushioning element as a component of a sole structure. In addition, the bladder can be used as a cushioning element in the strap of a backpack or other bag.

The article of footwear of the present disclosure may be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields).

The article of footwear can be designed for use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces.

Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

The article including the printed layer can be incorporated into a number of different types of articles of manufacture such as footwear or clothing apparel. For example the article can be incorporated into an upper or lower of a shoe to provide a decorative feature or can be incorporated into backpack. The article can be a bladder including the printed layer, where the bladder can be incorporated into a number of different types of articles of manufacture such as footwear or clothing apparel. The bladder can be used as a cushioning element in the strap of a backpack or other bag. When the bladder is incorporated into footwear, the bladder can be incorporated into a sole which can be affixed to an upper as well as other components to form the footwear. In this regard, one or more portions of the bladder can be visible (e.g., not covered) so that the printed layer can be seen by a person observing the article. For example, the bladder can be used in the sole of a shoe, where one or more portions of the bladder are exposed or can otherwise be seen through openings in the sole or other portion of the shoe. The present disclosure can provide articles that can include the printed layer on the bladder, which provide a robust and visually appealing article. The printed layer can provide a decorative feature for footwear.

When the bladder is incorporated into footwear, the bladder can be incorporated into an upper or lower of a shoe to provide a decorative feature. The bladder can be incorporated into a sole which can be affixed to an upper as well as other components to form the footwear. In this regard, one or more portions of the bladder can be visible (e.g., not covered) so that the printed layer can be seen by a person observing the article. For example, the bladder can be used in the sole of a shoe, where one or more portions of the bladder are exposed or can otherwise be seen through openings in the sole or other portion of the shoe. The present disclosure can provide articles that can include the printed layer on the bladder, which provide a robust and visually appealing article. The printed layer can provide a decorative feature for footwear.

Figure 2:
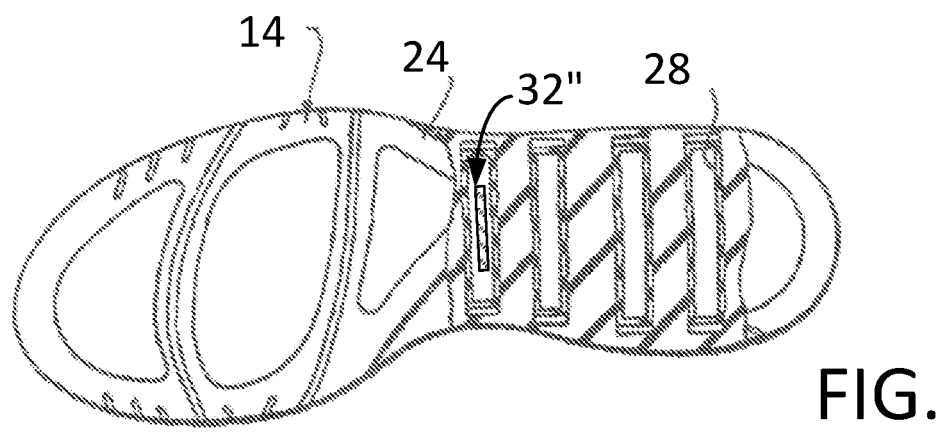
FIG. 2 is a bottom elevational view of the athletic shoe of FIG. 1 with a portion cut-a-way to expose another cross-sectional view.
Figure 3:
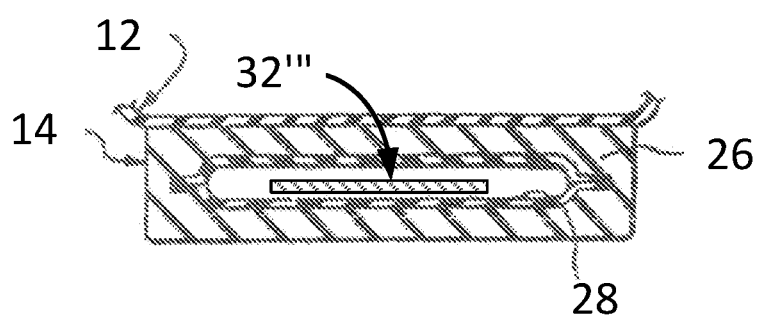
FIG. 3 is a section view taken along line 3-3 of FIG. 1.

FIGS. 1-3 show an article of footwear including a sole structure and a cushioning device fabricated from a bladder of the present disclosure. The footwear 10 includes an upper 12 to which the sole 14 is attached. The upper 12 can be formed from a variety of conventional materials including, e.g., textiles including leathers, vinyls, nylons and other generally woven and non-woven fibrous materials. Typically, the upper 12 includes reinforcements located around the toe 16, the lacing eyelets 18, the top of the footwear 20 and along the heel area 22. As with most articles of footwear, the sole 14 extends generally the entire length of the footwear 10 from the toe region 16 through the midfoot region 24 and back to the heel portion 22.

FIG. 3 illustrates a printed layer 32 on the surface of the bladder 28 in a shoe (FIGS. 1 and 2 do not include the printed layer 32 for reasons of clarity). The sole 14 includes one or more bladders 28 disposed in the mid-sole 26 of the sole structure. The bladder 28 can be formed having various geometries such as a plurality of tubular members positioned in a spaced apart, parallel relationship to each other within the heel region 22 of the mid-sole 26. Numerous other geometries can be used and bladders of the present disclosure are not limited to the one shown in FIGS. 1-2. The tubular members 28 are sealed bladders containing an injected captive gas. Alternatively, the cushioning elements can be formed of foamed polymeric materials.

Now having described aspects of the present disclosure, additional details are provided in relation to bladders having the printed layer disposed thereon. The printed layer can be disposed on the inside surface (e.g., an interior-facing side) and/or the outside surface (e.g., an exterior-facing side) of the bladder. The bladder is capable of including a volume of a fluid. An unfilled bladder is a fluid-fillable bladder and a filled bladder that has been at least partially inflated with a fluid at a pressure equal to or greater than atmospheric pressure. When disposed onto or incorporated into an article of footwear, apparel, or sports equipment, the bladder is generally, at that point, a fluid-filled bladder. The fluid can be a gas or a liquid. The gas can include air, nitrogen gas ($N_2$), or other appropriate gas.

The bladder, with the printed layer, can have a gas transmission rate for nitrogen gas, for example, where a bladder wall of a given thickness has a gas transmission rate for nitrogen that is at least about ten times lower than the gas transmission rate for nitrogen of a butyl rubber layer of substantially the same thickness as the thickness of the bladder described herein. The bladder can have a first bladder wall having a first bladder wall thickness (e.g., about 0.1 to 40 mils). The bladder can have a first bladder wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. The bladder can have a first bladder wall having a first bladder wall thickness, where the first bladder wall has a gas transmission rate of 15 $cm^3/m^2 \cdot atm \cdot day$ or less for nitrogen for an average wall thickness of 20 mils.

The bladder, with the printed layer, can have a bladder wall having the interior-facing side and the exterior-facing side, where the interior-facing side defines at least a portion of an interior region of the bladder and the exterior-facing side defines at least a portion of the exterior region of the bladder. The printed layer can be disposed on the exterior-facing side of the bladder, the interior-facing side of the bladder, or both, while still maintaining the gas transmission characteristics noted above.

The bladder can include a top wall operably secured to the footwear upper, a bottom wall opposite the top wall, and one or more sidewalls extending between the top wall and the bottom wall of the inflated bladder. The top wall, the bottom wall, and the one or more sidewalls collectively define an interior region of the inflated bladder, and wherein the one or more sidewalls each comprise an exterior-facing side.

An accepted method for measuring the relative permeance, permeability, and diffusion of inflated bladders is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

Permeance (quantity of gas)/[(area)×(time)×(pressure difference)]=permeance (GTR)/(pressure difference)=$cm^3/m^2 \cdot atm \cdot day$ (i.e., 24 hours)

Permeability

[(quantity of gas)×(film thickness)]/[(area)×(time)×(pressure difference)]=permeability [(GTR)×(film thickness)]/(pressure difference)=[(cm³)(mil)]/m²·atm·day (i.e., 24 hours)

Diffusion at One Atmosphere (quantity of gas)/[(area)×(time)]=GTR=cm³/m²·day (i.e., 24 hours)

The bladder can include a bladder wall that includes a film including at least one polymeric layer or at least two or more polymeric layers. Each of the polymeric layers can be about 0.1 to 40 mils in thickness. The printed layer can be disposed on the film. In an embodiment, the printed layer can be disposed between one or more layers of the bladder wall and/or on the interior-facing side and the exterior-facing side. Additional details regarding the materials used to form the bladder (e.g., films and the like) are provided below.

Now having described features of the present disclosure generally, other features are now described in more detail. The color composition includes at least one colorant, water, at least one solvent, and the like. The colorant can be a dye such as an anionic dye, a cationic dye, a direct dye, a metal complex dye, a basic dye, a disperse dye, a solvent dye, a polymeric dye, a polymeric dye colorant, or a nonionic dye, where the color composition and the printed layer can include one or more dyes and/or types of dyes. The dye can be a water-miscible dye. The dye can be a solubilized dye. The anionic dye can be an acid dye.

Acid dyes are water-soluble anionic dyes. Acid dyes are available in a wide variety, from dull tones to brilliant shades. Chemically, acid dyes include azo, anthraquinone and triarylmethane compounds. The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the color composition.

Acid dyes and nonionic disperse dyes are commercially available from many sources, including Dystar L.P., Charlotte, NC under the tradename TELON, Huntsman Corporation, Woodlands, TX, USA under the tradename ERIONYL and TECTILON, BASF SE, Ludwigshafen, Germany under the tradename BASACID, and Bezema AG, Montlingen, Switzerland under the tradename Bemacid.

The colorant can include the dye and a quaternary ammonium salt (e.g., quaternary (tetraalkyl) ammonium salt), in particular when the dye is acidic dye. The quaternary salt can be include four groups attached to the N atom, wherein the each can be selected independently from a hydrocarbon group R (e.g., R can be an alkyl group such as a C1 to C6 alkyl group) or non-hydrocarbon chains such as ether (—C(O)—R1 (e.g., R1 can be an alkyl group such as a C1 to C6 alkyl group)), ester (—C(O)—O—R1 (e.g., R1 can be an alkyl group such as a C1 to C6 alkyl group)) and amide (—C(O)—NR1R2 (e.g., R1 and R2 can each independently be an alkyl group such as a C1 to C6 alkyl group)). The quaternary (tetraalkyl) ammonium salt can react with the dye (e.g., acid dye) to form a complexed dye that can be used in the color composition and printed layer. The "alkyl" group can include C1 to C10 alkyl groups. The quaternary (tetraalkyl) ammonium salt can be selected from soluble tetrabutylammonium compounds and tetrahexylammonium compounds. The counterion of the quaternary ammonium salt should be selected so that the quaternary ammonium salt forms a stable solution with the dye (e.g., anionic dye). The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphite, borate, tetrafluoroborate, cyanide, isocyanide, azide, thiosulfate, thiocyanate, or carboxylate (such as acetate or oxalate). The tetraalkylammonium compound can be or include a tetrabutylammonium halide or tetrahexylammonium halide, particularly a tetrabutylammonium bromide or chloride or a tetrahexylammonium bromide or chloride. The color composition and printed layer (prior to curing) can include about 1 to 15 weight percent of the quaternary ammonium salt. The molar ratio of the acid dye to the quaternary ammonium compound can range from about 4:1 to 1:4 or about 1.5:1 to 1:1.5.

The solvent of the color composition can be a water-soluble organic solvent. Water solubility of a particular organic solvent used in a particular amount in the color composition is determined at 20 degree Celsius and 1 atmosphere pressure at the concentration at which the alcohol is to be used in the dye solution; the organic solvent is water soluble if it fully dissolves or is fully miscible in water at 20 degree Celsius and 1 atmosphere pressure at the concentration at which the alcohol is to be used in the dye solution and does not form any separate phase or layer. The color composition can be substantially free (e.g., about 90 percent or more, about 95 percent or more, about 99 percent or more, about 99.9 percent or more) or completely free of n-methyl pyrrolidone (NMP).

The water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, glycerol; ketones, such as acetone and methyl ethyl ketone; esters, such as butyl acetate, which is soluble in limited amounts in water; cyclic sulfone, such as sulfolane; glycol ethers and glycol ether esters (particularly acetates), such as ethylene glycol monobutyl ether, propylene glycol monomethyl ether, and propylene glycol monomethyl ether acetate; lactams, such as pyrrolidone; and lactones such as &-caprolactone; and any combination thereof.

The water-soluble organic solvent may be included in concentrations of up to about 50 percent by volume, or up to about 25 percent by volume, or from about 1 percent to about 50 percent by volume, or from about 5 percent to about 40 percent by volume, or from about 10 percent to about 30 percent by volume, or from about 15 percent to about 25 percent by volume of the aqueous medium used to make the color composition. Whether an organic solvent is used and how much organic solvent is used may be varied according to which dye is used and to the application method.

Now having described some aspects of the present disclosure generally, additional details regarding the polymer chemistry of the first composition, polymeric material of the article, and the like are provided. As described herein, the first composition can include a dispersion of uncrosslinked polymers while the first side of the article can comprise the polymeric material. The dispersion of uncrosslinked polymers and the polymeric material can each be independently selected from thermoplastic polymers, for example.

The dispersion of uncrosslinked polymers and the polymeric material can each be independently selected from polyurethane polymers, which are described in more detail below. In an aspect, the polyurethane polymer can be a polyester polyurethane copolymer. In an aspect, the dispersion of polymers can include a water-dispersible uncrosslinked polyurethane. In an aspect, the dispersion of polymers can include a dispersion of uncrosslinked polyurethane polymers, including a dispersion of uncrosslinked polyester polyurethane copolymers.

The terms "water-dispersible" and "water-borne" herein means the carrier of the dispersion includes about 50 weight percent to 100 weight percent water, about 60 weight percent to 100 weight percent water, about 70 weight percent to 100 weight percent water, or about 100 weight percent water. The terms "water-dispersible" and "water-borne dispersion" refers to a dispersion of a component (e.g., polymer, crosslinker, and the like) in water without co-solvents. A co-solvent can be used in the water-borne dispersion and the co-solvent can be an organic solvent.

The first composition of the present disclosure comprises uncrosslinked polymers, alone or optionally in combination with unpolymerized monomers and/or oligomers, as described below. The printed layer of the present disclosure, including the crosslinked polymeric matrix, comprises crosslinked polymers, optionally in combination with uncrosslinked polymers, as described below. Additionally, the article or components of the articles of the present disclosure can be formed from polymeric materials comprising polymers as described below. Additional components of the articles described herein can include polymeric materials comprising crosslinked or uncrosslinked polymers as described below.

The polymeric material of the article can be a foamed polymeric material. The polymeric material can be foamed and/or molded using various methods. In one example, the foamed material can be foamed as part of an injection molding process or as the polymeric material is extruded into a mold or sheet. Optionally, the foamed material can subsequently be compression molded. Compression molding of the foamed material can modify the properties of the foamed material, such as reducing the compression set of the foamed material, which can be beneficial for foamed materials used in footwear-related applications. In one example, the foamed material can comprise a plurality of foamed particles, where each individual foamed particle of the plurality of foamed particles is affixed to at least one other individual foamed particle of the plurality.

The polymer of the first composition and the polymeric material can be a thermoset polymer or a thermoplastic polymer. The polymer can be an elastomeric polymer, including an elastomeric thermoset polymer or an elastomeric thermoplastic polymer. The polymer can be selected from: polyurethanes (including elastomeric polyurethanes, thermoplastic polyurethanes (TPUs), and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof.

The term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

The polymer of the first composition and the polymeric material can be a thermoset polymer. As used herein, a "thermoset polymer" is understood to refer to a polymer which cannot be heated and melted, as its melting temperature is at or above its decomposition temperature. A "thermoset material" refers to a material which comprises at least one thermoset polymer. The thermoset polymer and/or thermoset material can be prepared from a precursor (e.g., an uncured or partially cured polymer or material) using thermal energy and/or actinic radiation (e.g., ultraviolet radiation, visible radiation, high energy radiation, infrared radiation) to form a partially cured or fully cured polymer or material which no longer remains fully thermoplastic. In some cases, the cured or partially cured polymer or material may remain thermoelastic properties, in that it is possible to partially soften and mold the polymer or material at elevated temperatures and/or pressures, but it is not possible to melt the polymer or material. The curing can be promoted, for example, with the use of high pressure and/or a catalyst. In many examples, the curing process is irreversible since it results in cross-linking and/or polymerization reactions of the precursors. The uncured or partially cured polymers or materials can be malleable or liquid prior to curing. In some cases, the uncured or partially cured polymers or materials can be molded into their final shape, or used as adhesives. Once hardened, a thermoset polymer or material cannot be re-melted in order to be reshaped. The textured surface can be formed by partially or fully curing an uncured precursor material to lock in the textured surface of the textured structure.

Polyurethane

The polymer can be a polyurethane, such as a thermoplastic polyurethane (also referred to as "TPU"). Alternatively, the polymer can be a thermoset polyurethane. Additionally, polyurethane can be an elastomeric polyurethane, including an elastomeric TPU or an elastomeric thermoset polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

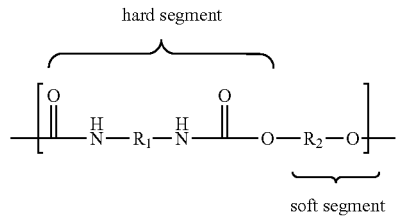

(Formula 1)

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_3$, each $R_3$ independently is an aliphatic or aromatic functional group.

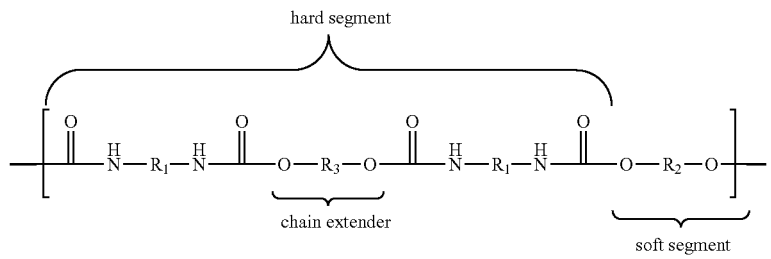

(Formula 2)

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers which form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term $C_n$ it means the alkene or alkylene group has "n" carbon atoms. For example, $C_{1-6}$ alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90 percent of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80 percent of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol, 1,5-diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol 1,5-diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkenylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkenylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ group can include charged groups that are capable of binding to a counterion to ionically crosslink the polymer and form ionomers. For example, $R_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

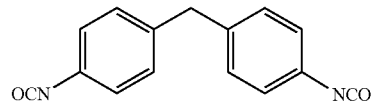

(Formula 3)

The pendant hydrophilic group can be a polyethylene oxide group and the linking group can be MDI, as shown below.

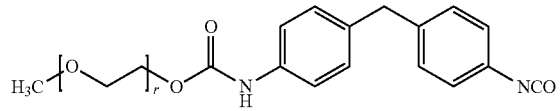

(Formula 4)

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

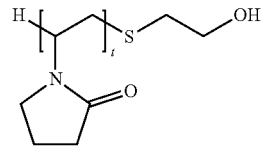

(Formula 5)

At least one $R_2$ group in the polyurethane can include a polytetramethylene oxide group. At least one $R_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference.

For example, the $R_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

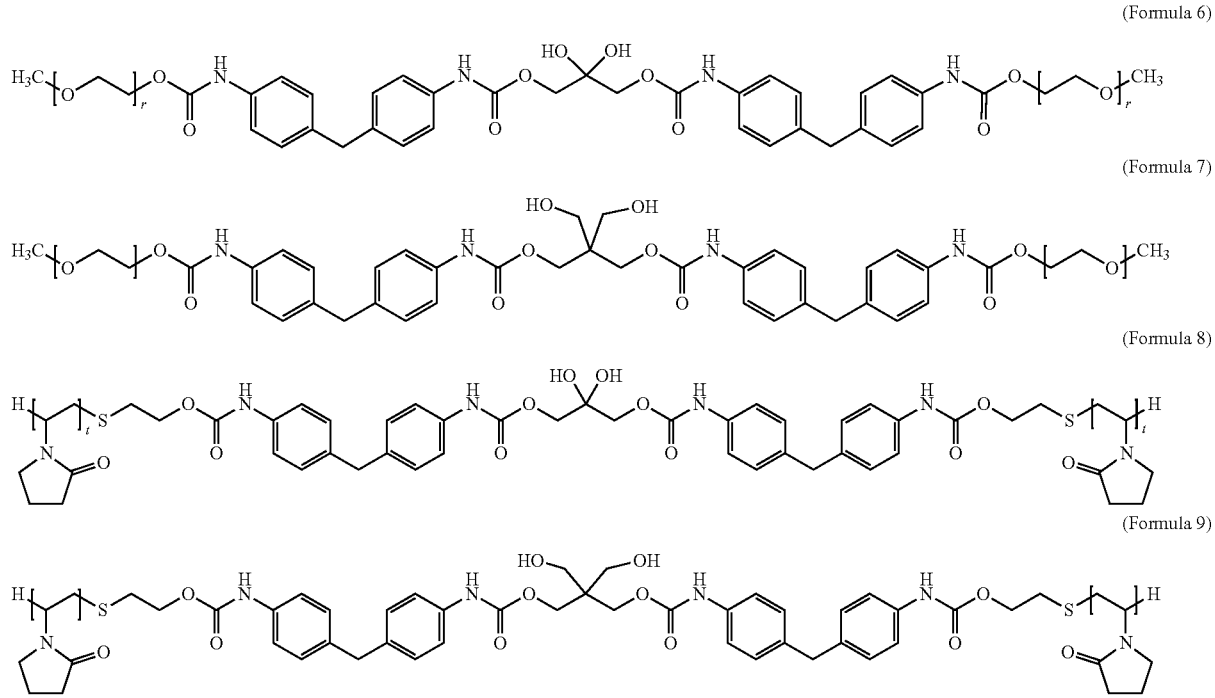

(Formula 6)

(Formula 7)

(Formula 8)

(Formula 9)

At least one $R_2$ of the polyurethane can be a polysiloxane. In these cases, the $R_2$ group can be derived from a silicone monomer of Formula 10, such as a silicone monomer disclosed in U.S. Pat. No. 5,969,076, which is hereby incorporated by reference:

(Formula 10)

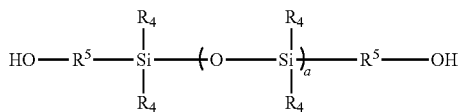

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, isopropyl, n-butyl, isobutyl, s-butyl, t-butyl, ethenyl, propenyl, phenyl, and polyethylene groups.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). The crosslinked polyurethane can be a thermoset polymer. This crosslinked polymeric network can be produced by polymerizing one or more isocyanates with one or more polyamino compounds, polysulfhydryl compounds, or combinations thereof, as shown in Formulas 11 and 12, below:

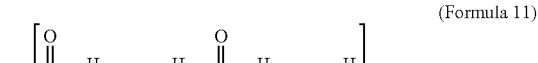

(Formula 11)

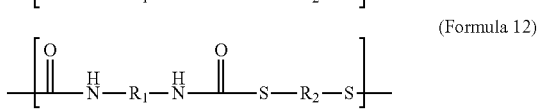

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

The polyurethane can be a thermoplastic polyurethane composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the "SANCURE" series of polymer such as "SANCURE" 20025F) or "TECOPHILIC" (e.g., TG-500, TG-2000, SP-80A-150, SP-93A-100, SP-60D-60) (Lubrizol, Countryside, IL, USA), "PELLETHANE" 2355-85ATP and 2355-95AE (Dow Chemical Company of Midland, MI, USA.), "ESTANE" (e.g., ALR G 500, or 58213; Lubrizol, Countryside, IL, USA).

One or more of the polyurethanes (e.g., the cured coating the coating composition (e.g., water-dispersible uncrosslinked polyurethane)) can be produced by polymerizing one or more isocyanates with one or more polyols to produce copolymer chains having carbamate linkages (—N(C=O)O—) and one or more functional groups (e.g., one or more water-dispersible enhancing moieties), where the polymer chain includes one or more functional groups (e.g., a monomer in polymer chain). The water-dispersible uncrosslinked polyurethane can also be referred to as "a water-borne uncrosslinked polyurethane polymer dispersion." The functional groups (e.g., water-dispersible enhancing moiety) can be added to the chain of Formula 1 or 2 (e.g., within the chain and/or onto the chain as a side chain). Inclusion of the water-dispersible enhancing moiety enables the formation of a water-borne uncrosslinked polyurethane dispersion. The co-solvent can be used in the water-borne dispersion and the co-solvent can be an organic solvent. Additional detail regarding the polymers, polyurethanes, isocyantes and the polyols are provided below.

The polyurethane (e.g., a water-borne uncrosslinked polyurethane polymer dispersion) can include one or more water-dispersible enhancing moieties. The water-dispersible enhancing moiety can have at least one hydrophilic (e.g., poly(ethylene oxide)), ionic or potentially ionic group to assist dispersion of the polyurethane, thereby enhancing the stability of the dispersions. A water-dispersible uncrosslinked polyurethane can be formed by incorporating a moiety bearing at least one hydrophilic group or a group that can be made hydrophilic (e.g., by chemical modifications such as neutralization) into the polymer chain. For example, these compounds can be nonionic, anionic, cationic or zwitterionic or the combination thereof. In one example, anionic groups such as carboxylic acid groups can be incorporated into the chain in an inactive form and subsequently activated by a salt-forming compound, such as a tertiary amine. Other water-dispersible enhancing moieties can also be reacted into the backbone through urethane linkages or urea linkages, including lateral or terminal hydrophilic ethylene oxide or ureido units.

The water-dispersible enhancing moiety can be a one that includes carboxyl groups. Water-dispersible enhancing moiety that include a carboxyl group can be formed from hydroxy-carboxylic acids having the general formula $(HO)_xQ(COOH)_y$, where Q can be a straight or branched bivalent hydrocarbon radical containing 1 to 12 carbon atoms, and x and y can each independently be 1 to 3. Illustrative examples include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof.

The water-dispersible enhancing moiety can include reactive polymeric polyol components that contain pendant anionic groups that can be polymerized into the backbone to impart water dispersible characteristics to the polyurethane. Anionic functional polymeric polyols can include anionic polyester polyols, anionic polyether polyols, and anionic polycarbonate polyols, where additional detail is provided in U.S. Pat. No. 5,334,690.

The water-dispersible enhancing moiety can include a side chain hydrophilic monomer. For example, the water-dispersible enhancing moiety including the side chain hydrophilic monomer can include alkylene oxide polymers and copolymers in which the alkylene oxide groups have from 2-10 carbon atoms as shown in U.S. Pat. No. 6,897,281. Additional types of water-dispersible enhancing moieties can include thioglycolic acid, 2,6-dihydroxybenzoic acid, sulfoisophthalic acid, polyethylene glycol, and the like, and mixtures thereof. Additional details regarding water-dispersible enhancing moieties can be found in U.S. Pat. No. 7,476,705.

Polyamides

The polymer can comprise a polyamide, such as a thermoplastic polyamide, or a thermoset polyamide. The polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO) NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein $R_6$ group represents the portion of the polyamide derived from the lactam or amino acid.

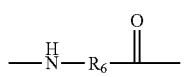
(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or laurolactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

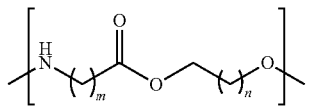
(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

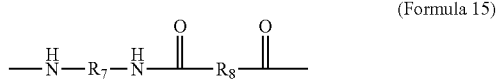
(Formula 15)

The $R_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the $R_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The $R_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

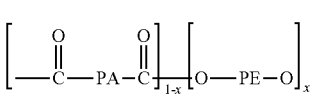
(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, ω-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one a, w-aminocarboxylic acid (or a lactam), at least one diamine and at least one dicarboxylic acid. In copolymers of this type, a a, w-aminocarboxylic acid, the lactam and the dicarboxylic acid can be chosen from those described herein above and the diamine such as an aliphatic diamine containing from 6 to 12 atoms and can be acyclic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl) methane (BACM) and bis(3-methyl-4-aminocyclohexyl) methane (BMACM) can be used.

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide) s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide) s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly(ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies. In other cases, the crosslinked polyamide is a thermoset polymer.

Polyesters

The polymers can comprise a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolymer. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly (3-hydroxbutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly(α-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The polymers can comprise or consist essentially of a polyolefin. The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary polyolefins can include polyethylene, polypropylene, and olefin elastomers (e.g., metallocene-catalyzed block copolymers of ethylene and α-olefins having 4 to about 8 carbon atoms). The polyolefin can be a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium (III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

In regard to "consists essentially of", the polymeric material and the first composition does not include substantial amounts (e.g., greater than about 1 weight percent) of types of polymer besides those listed, but the material may include non-polymeric ingredients such as fillers, pigments, UV absorbers, and the like.

The first layer, the polymeric material, the color composition, and other components of the article can optionally include additives, fillers, lubricants, antioxidants, ultraviolet absorbers, antistatic agents, flame retardants, fungicides, antibacterial agents, combinations thereof, or the like. In addition, first layer, the polymeric material, the color composition, and other components of the article can optionally include monomers, oligomers, thermal initiators, photoinitiators, and catalysts.

The additives can include, but are not limited to, processing agents, anti-oxidants, ultraviolet stabilizers, optical brighteners, extenders, solid and liquid colorants, fillers, coupling agents, plasticizers, rheology modifiers, stabilizers, delusterants, antimicrobial agents, antistatic agents, and other functional additives, and combinations of additives.

The fillers can be utilized to increase strength of the material, abrasion resistance, modify thermal properties, reduce cost, and alter viscosity, thixotropy or overall fluid flow properties of the elastomer composition. The amount of filler (in terms of "phr" or parts by weight based on 100 parts of the elastomer, for example) can be varied to achieve the desired effective property such as strength, viscosity, and the like.

The filler can include, but is not limited to, clay, talc, asbestos, graphite, glass, mica (such as phologopite, biotie, zinnwaldite, muscovite, paragonite, celadonite and glauconite, clinochlore, chamosite, nimite, pennantite, sudoite, donbasite, clintonite, margarite, thulite, antigorite, lizardite, chrysotile, mesite, cronstedite, berthierine, greenalite, garnierite, and the like), calcium metasilicate, alumina, zinc sulfide, aluminum hydroxide, silica (such as amorphous silica, amorphous synthesized silica, and colloidal silica), silicates (such as actinolite, tourmaline, serpentine, aluminosilicates, and the like), silicon carbide, diatomaceous earth, carbonates (such as barium carbonate, calcium carbonate, magnesium carbonate and the like), kaolin (such as delaminated kaolin, calcined kaolin, and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), suitable organic fillers include, but are not limited to, carbon black, fullerene and/or carbon nanotubes, melamine colophony, cellulose fibers, polyamide fibers, polyacrylonitrile fibers, polyurethane fibers, polyester fibers based on aromatic and/ aliphatic dicarboxylic acid esters, carbon fibers or mixtures thereof, particulate synthetic plastics (such as high molecular weight polyethylene, polypropylene, polystyrene, polyethylene ionomeric resins, polyamide, polyester, polyurethane, polyimide, and the like), particulate carbonaceous materials (such as carbon black and the like), sulfates (such as calcium sulfate, magnesium sulfate, barium sulfate, and the like) as well as cotton flock, cellulose flock, cellulose pulp, leather fiber, and combinations of any of the above. The disclosed fillers can be spherical, needle-like, plate type forms and the like, or irregular forms. The filler can be a high aspect ratio fillers. Such fillers can be organic or inorganic. The high aspect fillers can be inorganic microfibers such as whiskers (highly crystalline small single crystal fibers) or somewhat less perfect crystalline fibers such as boron fibers, potassium titanate, calcium sulfate, asbestos and calcium metasilicate. Typical levels of these and other fillers include from about 10 phr to 100 phr or higher (where "phr" indicates parts by weight based on 100 parts of the elastomer). The composition can contain about 10-80, 30-70, 40-60, or 50-60 phr filler. The elastomer compositions comprise a silica filler. Typical levels of silica filler include from about 10 phr to 100 phr or higher. The compositions contain about 10-80, 30-70, 10-60, 40-60, 50-60, or 35-60 phr filler.

The additive can be a softener (also referred to herein as a softening agent). Examples of suitable softeners include, but are not limited to, oxyethylation products of higher fatty acids, fatty alcohols, or fatty acid amides, N-stearyl-urea compounds and stearylamidomethylpyridinium.

The additive can be a leveling agent. Examples of leveling agents include, but are not limited to, water-soluble salts of acidic esters obtained from polybasic acids and ethylene oxide or propylene oxide adducts of relatively long-chain base molecules capable of undergoing oxyalkylation.

As stated above, the printed layer can be on the inner or exterior surface of the bladder. The printed layer can be transparent or translucent or opaque. As used herein, a transparent printed layer means that light passes through the printed layer in straight lines and passes out of the printed layer and one can see clearly through the printed layer. For an opaque material, light does not pass through the material and one cannot see through the material at all. Translucent printed layer falls between a transparent printed layer and an opaque material, in that light passes through a translucent printed layer but some of the light is scattered so that one cannot see clearly through the printed layer.

Now referring again when the article is a bladder having the printed layer disposed on a surface of the bladder, the bladder includes a bladder wall that includes a film including at least one polymeric layer or at least two or more polymeric layers (e.g., film). In an aspect, each of the polymeric layers can be about 0.1 to 40 mils in thickness. The polymeric layer can be formed of polymer material such as a thermoplastic material as described above and herein. The thermoplastic material can include an elastomeric material, such as a thermoplastic elastomeric material. The thermoplastic materials can include thermoplastic polyurethane (TPU), such as those described above and herein. The thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company of Midland, MI., USA), "ELASTOLLAN" (BASF Corporation, Wyandotte, MI, USA) and "ESTANE" (Lubrizol, Brecksville, OH, USA), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

The polymeric layer can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLAST" ETPU available from Lubrizol (Brecksville, OH, USA); ethylene-vinyl alcohol copolymers marketed under the tradenames "EVAL" by Kuraray (Houston, TX, USA), "SOARNOL" by Nippon Gohsei (Hull, England), and "SELAR OH" by DuPont (Wilmington, DE, USA); polyvinylidene chloride available from S.C. Johnson (Racine, WI, USA) under the tradename "SARAN", and from Solvay (Brussels, Belgium) under the tradename "IXAN"; liquid crystal polymers such as "VECTRA" from Celanese (Irving, TX, USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly(vinyl alcohol) s; and polymethylpentene resins available from Mitsui Chemicals (Tokyo, Japan) under the tradename "TPX".

Each polymeric layer of the film can be formed of a thermoplastic material which can include a combination of thermoplastic polymers. In addition to one or more thermoplastic polymers, the thermoplastic material can optionally include a colorant, a filler, a processing aid, a free radical scavenger, an ultraviolet light absorber, and the like. Each polymeric layer of the film can be made of a different of thermoplastic material including a different type of thermoplastic polymer. Each polymeric layer of the film can include a combination of thermoplastic materials. Each polymeric layer of the film can be made of different types of thermoplastic materials.

The bladder can be made by applying heat, pressure and/or vacuum to a film. The first layer of the first composition (e.g., a dispersion of polymers), as described herein, can be applied onto a surface (e.g., film) of the bladder. Then the color composition can be applied to the first layer while the first layer is wet (e.g., not yet dried). The first layer is considered wet if the solvent of the color composition can penetrate the polymeric layer of the bladder to produce a durable printed layer. The first layer including the color composition can be allowed to dry to form the printed layer. The first layer including the color composition can be cured to form the printed layer. The bladder can be unfilled, partially or fully inflated upon applying the first layer and/or color composition.

Applying can include spraying (e.g., using a spray gun) the first layer and/or the color composition onto the surface. The first layer can be applied first and then the color composition onto the surface. The color composition can be applied first then the first layer. The color composition and the first layer can be applied simultaneously. Curing includes heating the first layer to about 50° to 90° C. or about 60° to 80° C. for about 5 minutes or more.

The bladder can be treated prior to disposing the first layer, the color composition, and/or to drying. The treatment can include: plasma processing, corona processing, flame processing, or any combination thereof, which is set off from the surface by about 1 to 100 mm. Flame processing includes the combustion of a material (e.g., hydrocarbon) using a flame to treat the surface. Plasma processing uses a plasma (e.g., created using air or one or more of hydrogen, nitrogen and oxygen) to treat the surface. Corona processing includes the use of a corona discharge plasma (e.g., created using electric fields) to treat the surface.

In an aspect, the bladder (e.g., one or more polymeric layers) can be formed using one or more polymers and forming the bladder using one or more processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. In an aspect, the bladder can be made by co-extrusion followed by heat sealing or welding to give an inflatable bladder, which can optionally include one or more valves (e.g., one way valves) that allows the bladder to be filled with the fluid (e.g., gas).

In an aspect, the bladder has a first bladder wall having a first bladder wall thickness, wherein the first bladder wall has a gas transmission rate of 15 $cm^3/m^2 \cdot atm \cdot day$ or less for than nitrogen for an average wall thickness of 20 mils.

The present disclosure provides for the following clauses.

Clause 1. A method of printing on an article, comprising: applying a first composition onto a first side of an article, wherein the first composition comprises a dispersion of uncrosslinked polymers, and the first side of the article comprises a polymeric material; applying a color composition onto the first layer; and allowing the color composition and the first layer to dry in contact with the first side forming a printed layer on the first side of the article.

Clause 2. The method of any proceeding clause, wherein the step of applying the color composition onto the first side of the article comprises applying the color composition to the polymeric material exposed on the first side of the article, and, following the step of applying the color composition but prior to the step of allowing the color composition to dry, the method further comprises allowing the color composition to penetrate into the polymeric material.

Clause 3. The method of any proceeding clause, wherein the printed layer extends from a surface of the first side of the article into the polymeric material.

Clause 4. The method of any proceeding clause, wherein the first side of the article comprises a film, and the film includes an exposed layer comprising the polymeric material.

Clause 5. The method of any proceeding clause, wherein, following the step of allowing the color composition to dry, the first side of the article has a gas transmission rate of 15 $cm^3/m^2 \cdot atm \cdot day$ or less for nitrogen for an average wall thickness of 20 mils.

Clause 6. The method of any proceeding clause, wherein the film is a multi-layer film including two or more layers of the polymeric material alternating with one or more layers of a barrier material comprising one or more polymers having a lower gas permeability than the polymeric material.

Clause 7. The method of any proceeding clause, wherein the step of allowing the color composition to penetrate into the polymeric material comprises allowing the color composition to penetrate into an outer portion of the exposed layer of the film, wherein the exposed layer of the film comprises the polymeric material.

Clause 8. The method of any proceeding clause, wherein the step of allowing the color composition to penetrate into the polymeric material comprises allowing the color composition to penetrate into the outer portion of the exposed layer of the film, but not into a layer of the barrier material adjacent to the exposed layer of the film.

Clause 9. The method of any proceeding clause, wherein the barrier material comprises one or more ethylene-vinyl alcohol copolymer.

Clause 10. The method of any preceding clause, wherein the method further comprises: applying a first layer of the first composition to the polymeric material on the first side of the article prior to applying the color composition to the first side of the article, the step of applying the color composition to the first side of the article comprises applying the color composition to the first layer while the first composition of the first layer remains wet, and the step of allowing the color composition to dry comprises allowing the color composition and the first composition of the first layer to dry on the first side of the article.

Clause 11. The method of any proceeding clause, wherein the color composition comprises a solvent.

Clause 12. The method of any proceeding clause, wherein the solvent is selected from alcohols, ketones, esters, cyclic sulfones, glycol ethers, glycol ether esters, lactams, and lactones.

Clause 13. The method of any preceding clause, wherein the first composition comprises the dispersion of uncrosslinked polymers in a carrier.

Clause 14. The method of any proceeding clause, wherein the carrier is water or an aqueous solution.

Clause 15. The method of any preceding clause, wherein the printed layer is a matrix of crosslinked polymers.

Clause 16. The method of any proceeding clause, wherein the matrix of crosslinked polymers includes crosslinked polyurethane homopolymers or copolymers or both, and optionally includes crosslinked polyester polyurethanes.

Clause 17. The method of any preceding clause, wherein the printed layer is elastomeric and is the product of crosslinking the first layer in the presence of the color composition.

Clause 18. The method of any preceding clause, wherein the dispersion of uncrosslinked polymers is a water-borne dispersion of uncrosslinked polymers and the carrier is water or an aqueous solution.

Clause 19. The method of any preceding clause, wherein the first composition, the color composition, or both comprise a crosslinking agent.

Clause 20. The method of any preceding clause, wherein the crosslinking agent is a water-borne crosslinking agent and the carrier is water or an aqueous solution.

Clause 21. The method of any preceding clause, wherein the first composition comprises a solution comprising an organic solvent, optionally wherein the solution is an aqueous solution and the organic solvent is a water-miscible organic solvent.

Clause 22. The method of any preceding clause, wherein the dispersion of uncrosslinked polymers includes a water-borne dispersion of uncrosslinked polyurethane copolymers, a water-borne dispersion of uncrosslinked polyester polyurethane polymers, or both.

Clause 23. The method of any preceding clause, wherein the uncrosslinked polyurethane copolymers is the product of a polymerizing reaction of one or more isocyanates with one or more polyols, and optionally the one or more isocyanates or the one or more polyols or both include functional groups increasing the water-dispersability of the uncrosslinked polyurethane copolymers as compared to uncrosslinked polyurethane copolymers formed by reacting substantially the same one or more isocyanates or one or more polyols or both which do not include the functional groups.

Clause 24. The method of any preceding clause, wherein the dispersion of uncrosslinked polymers includes one or more of a crosslinking agent, a pigment, or a dye.

Clause 25. The method of any preceding clause, wherein the first composition has a viscosity of less than 1000 cP.

Clause 26. The method of any preceding clause, wherein applying comprises: spraying the color composition onto the first layer.

Clause 27. The method of any preceding clause, wherein the printed layer has an elongation at break of at least 500 percent.

Clause 28. The method of any preceding clause, wherein the first composition is substantially free of n-methyl pyrrolidone (NMP).

Clause 29. The method of any preceding clause, further comprising: dyeing the printed layer on the first side of the article.

Clause 30. The method of any proceeding clause, wherein dyeing the printed layer on the first side of the article comprises immersing at least a portion of the side including the printed layer in a dye solution comprising a dye.

Clause 31. The method of any preceding clause, wherein applying the color composition comprises: printing the color composition on the first side of the article.

Clause 32. The method of any proceeding clause, wherein the printing comprises jetting, spraying, dropping, or a combination thereof the color composition onto the first layer.

Clause 33. The method of any preceding clause, wherein the color composition comprises one or more pigments, dyes, water, one or more organic solvents, or a combination thereof.

Clause 34. The method of any proceeding clause, wherein the pigment is selected from the group consisting of: metal and metal oxide pigments, carbon pigments, clay earth pigments, ultramarine pigments and a combination thereof.

Clause 35. The method of any proceeding clause, wherein the dye is selected from an acid dye, a metal complex dye, and a combination thereof.

Clause 36. The method of any proceeding clause, wherein the color composition comprises an acid dye and a quaternary ammonium compound.

Clause 37. The method of any proceeding clause, wherein the quaternary ammonium compound is a tetrabutyl ammonium compound.

Clause 38. The method of any proceeding clause, wherein the tetraalkyl ammonium compound is a tetrabutyl ammonium halide.

Clause 39. The method of any proceeding clause, wherein the color composition comprises from about 1 to about 15 weight percent of the quaternary ammonium compound Clause 40. The method of any proceeding clause, wherein the coating composition comprises a molar ratio of the acid dye to the quaternary ammonium compound ranges from about 4:1 to about 1:4, or from about 1.5:1 to about 1:1.5.

Clause 41. The method of any proceeding clause, wherein the metal complex dye is selected from an azo metal complex dye or an anthraquinone metal complex dye.

Clause 42. The method of any proceeding clause, wherein the polymeric material comprises one or more polyurethane, polyether, polyester, polyurea, polyamide, polyolefin, or any combination thereof.

Clause 43. The method of any proceeding clause, wherein the polymeric material comprises one or more polyurethane, optionally one or more thermoplastic polyurethane.

Clause 44. The method of any preceding clause, wherein the polymeric material comprises one or more polyester-polyurethane copolymer, optionally one or more thermoplastic polyester-polyurethane copolymer.

Clause 45. The method of any preceding clause, wherein the polymeric material includes a polyurethane homopolymer or copolymer, a polyamide homopolymer or copolymer, a polyether homopolymer or copolymer, a polyester homopolymer or copolymer, or any combination thereof.

Clause 46. The method of any preceding clause, wherein a polymeric component of the polymeric material consisting of all polymers present in the polymeric material consists essentially of one or more polyurethane homopolymers, one or more polyurethane copolymers, or any combination thereof.

Clause 47. The method of any preceding clause, wherein the polyurethane copolymer includes a polyester polyurethane copolymer.

Clause 48. The method of any preceding clause, wherein a polymeric component of the polymeric material consisting of all polymers present in the polymeric material consists essentially of one or more polyether homopolymers, one or more polyether copolymers, or any combination thereof.

Clause 49. The method of any preceding clause, wherein the polyether copolymer includes a polyether block amide (PEBA) copolymer.

Clause 50. The method of any preceding clause, wherein a polymeric component of the polymeric material comprised of all polymers present in the polymeric material consists essentially of one or more polyester homopolymers, one or more polyester copolymers, or any combination thereof.

Clause 51. The method of any proceeding clause, wherein the polyester homopolymer includes a poly(ethylene terephthalate) homopolymer or copolymer.

Clause 52. The method of any preceding clause, wherein the first polymeric material includes the polyamide homopolymer or copolymer.

Clause 53. The method of any preceding clause, wherein a polymeric component of the polymeric material comprised of all polymers present in the polymeric material consists essentially of one or more polyamide homopolymers, one or more polyamide copolymers, or any combination thereof.

Clause 54. The method of any preceding clause, wherein the polymeric material includes a polyisoprene homopolymer or copolymer, a polybutadiene homopolymer or copolymer, or any combination thereof.

Clause 55. The method of any preceding clause, wherein a polymeric component of the polymeric material consisting of all polymers present in the polymeric material consists essentially of one or more polyisoprene homopolymers or copolymers, one or more polybutadiene homopolymers or copolymers, or any combination thereof.

Clause 56. The method of any preceding clause, wherein the polymeric material includes a vinyl acetate homopolymer or copolymer, an acrylate homopolymer or copolymer, a styrene homopolymer or copolymer, an olefinic homopolymer or copolymer, or any combination thereof.

Clause 57. The method of any preceding clause, wherein a polymeric component of the polymeric material consisting of all polymers present in the polymeric material consists essentially of one or more vinyl acetate homopolymers or copolymers, one or more styrene homopolymers or copolymers, or any combination thereof.

Clause 58. The method of any proceeding clause, wherein the vinyl acetate copolymer is an ethylene-vinyl acetate copolymer.

Clause 59. The method of any proceeding clause, wherein the styrene copolymer is a styrene-ethylene-butadiene copolymer.

Clause 60. The method of any preceding clause, wherein the olefinic homopolymer or copolymer includes a polyethylene homopolymer or copolymer, a polypropylene homopolymer or copolymer, or any combination thereof.

Clause 61. The method of any preceding clause, wherein a polymeric component of the polymeric material consisting of all polymers present in the polymeric material consists essentially of one or more olefinic homopolymers or copolymers.

Clause 62. The method any preceding clause, wherein the polymeric component consists essentially of one or more olefinic homopolymers.

Clause 63. The article any preceding clause, wherein the olefinic homopolymer includes a polyethylene homopolymer, a polypropylene homopolymer, or both.

Clause 64. The method of any preceding clause, wherein the polymeric material is a thermoplastic polyurethane (TPU).

Clause 65. The method of any preceding clause, further comprising treating a first side of the TPU with plasma prior to applying the first layer of the first composition.

Clause 66. The method of any preceding clause, further comprising treating the first side of the TPU with plasma during applying the first layer of the first composition, applying the color composition onto the first layer, or during both.

Clause 67. The method of any preceding clause, wherein the article is a bladder wall having an interior-facing side and an exterior-facing side, wherein the interior-facing side defines at least a portion of an interior region of the inflated bladder, wherein the bladder wall has an average wall thickness between the interior-facing side and exterior-facing side that is less than 5 millimeters, wherein the first side of the article comprises the exterior-facing side of the bladder wall or the interior-facing side of the bladder wall, wherein the bladder wall comprises the polymeric material on the exterior-facing side of the bladder wall or the interior-facing side of the bladder wall, wherein the printer layer is disposed on the exterior-facing side of the bladder wall or the interior-facing side of the bladder wall.

Clause 68. The method of any proceeding clause, wherein the bladder wall comprises a film that includes one or more polymeric layers.

Clause 69. The method of any proceeding clause, wherein the at least one polymeric layer is formed of a thermoplastic material.

Clause 70. The method of any proceeding clause, wherein the at least one polymeric layer is formed of an elastomeric material.

Clause 71. The method of any proceeding clause, wherein the elastomeric material includes one or more thermoplastic polyurethanes.

Clause 72. The method of any proceeding clause, wherein the film includes one or more layers of thermoplastic polyurethanes alternating with one or more layers of ethylene-vinyl alcohol copolymer.

Clause 73. The method of any proceeding clause, wherein a thickness of each of the one or more layers of ethylene-vinyl alcohol copolymer is in the range of 0.1 to 40 mils.

Clause 74. The method of any preceding clause, wherein the article is a cushioning element that includes the bladder.

Clause 75. The method of any preceding clause, wherein the article is a cushioning element for an article of apparel.

Clause 76. The method of any preceding clause, wherein the article of apparel is an article of footwear.

Clause 77. The method of any preceding clause, wherein the footwear includes a cushioning element including the bladder, wherein the cushioning element is a component of a sole structure of the footwear.

Clause 78. The method of any preceding clause, wherein the article is footwear or a component of footwear, wherein the bladder is affixed to the footwear or the component of footwear.

Clause 79. The method of any preceding clause, wherein the article is apparel or a component of apparel, wherein the bladder is affixed to the apparel or a component of apparel.

Clause 80. The method of any preceding clause, wherein the article is sports equipment or a component of sports equipment, wherein the bladder is affixed to the sports equipment or a component of sports equipment.

Clause 81. The method of any preceding clause, wherein allowing to dry includes heating the color composition and the first layer to about 50° to 90° C. for about 5 minutes or more.

Clause 82. An article comprising: a product of the method of clauses 1 to 81.

Clause 83. A method of making an article of footwear, comprising: affixing a first component and an article of clause 82 to one another, thereby forming an article of footwear.

Clause 84. An article of footwear comprising: a product of the method of claim 83.

Clause 85. An article comprising: an article having a first side comprising a polymeric material, the first side comprising a printed layer at least partially covering the polymeric material, wherein the printed layer includes a dried polymer dispersion and a dried colorant.

Clause 86. An article comprising: a bladder having a printed layer on a first side of the bladder, wherein the first side of the article comprises a polymeric material, wherein the printed layer is a product of a first composition and a color composition, wherein the first composition comprises a dispersion of uncrosslinked polymers.

Clause 87. The article of any proceeding clause, wherein the bladder wall has an interior-facing side and an exterior-facing side, wherein the interior-facing side defines at least a portion of an interior region of the inflated bladder, wherein the bladder wall has an average wall thickness between the interior-facing side and exterior-facing side that is less than 5 millimeters, wherein the first side of the article comprises the exterior-facing side of the bladder wall or the interior-facing side of the bladder wall, wherein the bladder wall comprises the polymeric material on the exterior-facing side of the bladder wall or the interior-facing side of the bladder wall, wherein the printed layer is disposed on the exterior-facing side of the bladder wall or the interior-facing side of the bladder wall.

Clause 88. The article of any preceding clause, wherein the bladder is a filled bladder including a volume of a fluid, optionally the fluid is a gas, optionally the gas includes nitrogen gas, optionally the filled bladder includes the volume of the fluid at a pressure above atmospheric pressure.

Clause 89. The article of any preceding clause, wherein the first bladder wall has a gas transmission rate of 15 $cm^3/m^2 \cdot atm \cdot day$ or less for nitrogen for an average wall thickness of 20 mils, Clause 90. The article of any preceding clause, wherein the bladder wall includes a film on the exterior-facing side of the bladder wall or the interior-facing side of the bladder wall, wherein the printed layer is on the film.

Clause 91. The article of any preceding clause, wherein the article is an article of footwear, a component of footwear, an article of apparel, a component of an article of apparel, an article of sporting equipment, or a component of sporting equipment; optionally wherein the article is a cushioning component or a decorative component.

Clause 92. The article of any preceding clause, wherein the article is a component of an upper of an article of footwear or a component of a sole structure of an article of footwear; optionally wherein the article is a component of a sole structure of an article of footwear.

Clause 93. The article of any preceding clause, wherein the film includes one or more polymeric layers made of the polymeric material as described in clauses 42-64.

Clause 94. The article of any preceding clause, wherein the printed layer includes the colorant as describe in clauses 33-40.

Clause 95. The article of any preceding clause, wherein the printed layer as describe in clauses 2-10.

Clause 96. An article of footwear, comprising a sole structure, wherein the sole structure includes a bladder of claims 86-95.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 weight percent to about 5 weight percent, but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. In an aspect, the term "about" can include traditional rounding according to significant figures of the numerical value. In addition, the phrase "about 'x' to 'y'" includes "about 'x' to about 'y'".

Many variations and modifications may be made to the above-described aspects. All such modifications and variations are intended to be included herein within the scope of this disclosure and protected by the following claims.

What is claimed is:

1. A method of printing on an article, which is an article of footwear, a component of footwear, apparel, a component of apparel, sporting equipment, or a component of sporting equipment, comprising:
    applying a first composition onto a first side of an article, wherein the first composition comprises a dispersion of uncrosslinked polymers, and the first side of the article comprises a polymeric material;
    applying a color composition onto the first layer; and
    allowing the color composition and the first layer to dry in contact with the first side forming a printed layer on the first side of the article;
    wherein the method further comprises applying a first layer of the first composition to the polymeric material on the first side of the article prior to applying the color composition to the first side of the article, the step of applying the color composition to the first side of the article comprises applying the color composition to the first layer while the first composition of the first layer remains wet, and the step of allowing the color composition to dry comprises allowing the color composition and the first composition of the first layer to dry on the first side of the article and
    wherein the polymeric material comprises one or more polyurethane, polyether, polyester, polyurea, polyamide, polyolefin, or any combination thereof.

2. The method of claim 1, wherein the step of applying the color composition onto the first side of the article comprises applying the color composition to the polymeric material exposed on the first side of the article, and, following the step of applying the color composition but prior to the step of allowing the color composition to dry, the method further comprises allowing the color composition to penetrate into the polymeric material.

3. The method of claim 2, wherein the first side of the article comprises a film, and the film includes an exposed layer comprising the polymeric material.

4. The method of claim 3, wherein the step of allowing the color composition to penetrate into the polymeric material comprises allowing the color composition to penetrate into an outer portion of an exposed layer of the film, but not into a layer of a barrier material adjacent to the exposed layer of the film.

5. The method of claim 1, wherein, following the step of allowing the color composition to dry, the first side of the article has a gas transmission rate of 15 $cm^3/m^2 \cdot atm \cdot day$ or less for nitrogen for an average wall thickness of 20 mils.

6. The method of claim 1, wherein the color composition comprises a solvent, wherein the solvent is selected from alcohols, ketones, esters, cyclic sulfones, glycol ethers, glycol ether esters, lactams, and lactones.

7. The method of claim 1, wherein the dispersion of uncrosslinked polymers is a water-borne dispersion of uncrosslinked polymers and in a carrier, wherein the carrier is water or an aqueous solution.

8. The method of claim 1, wherein the dispersion of uncrosslinked polymers includes a water-borne dispersion of uncrosslinked polyurethane copolymers, a water-borne dispersion of uncrosslinked polyester polyurethane polymers, or both.

9. The method of claim 8, wherein the uncrosslinked polyurethane copolymers are the product of a polymerizing reaction of one or more isocyanates with one or more polyols, and optionally the one or more isocyanates or the one or more polyols or both include functional groups increasing the water-dispersability of the uncrosslinked polyurethane copolymers as compared to uncrosslinked polyurethane copolymers formed by reacting substantially the same one or more isocyanates or one or more polyols or both which do not include the functional groups.

10. The method of claim 1, wherein the printed layer has an elongation at break of at least 500 percent.

11. The method of claim 1, wherein the color composition comprises one or more pigments, dyes, water, one or more organic solvents, or a combination thereof.

12. The method of claim 1, wherein the color composition comprises an acid dye and a quaternary ammonium compound.

13. The method of claim 1, wherein the article is a bladder wall having an interior-facing side and an exterior-facing side, wherein the interior-facing side defines at least a portion of an interior region of the inflated bladder, wherein the bladder wall has an average wall thickness between the interior-facing side and exterior-facing side that is less than 5 millimeters, wherein the first side of the article comprises the exterior-facing side of the bladder wall or the interior-facing side of the bladder wall, wherein the bladder wall comprises the polymeric material on the exterior-facing side of the bladder wall or the interior-facing side of the bladder wall, wherein the printer layer is disposed on the exterior-facing side of the bladder wall or the interior-facing side of the bladder wall.

14. The method of claim 13, wherein the bladder wall comprises a film that includes one or more polymeric layers, wherein the at least one polymeric layer is formed of a thermoplastic material, wherein the film includes one or more layers of thermoplastic polyurethanes alternating with one or more layers of ethylene-vinyl alcohol copolymer.

* * * * *